US011999913B2

(12) United States Patent
Moote (10) Patent No.: US 11,999,913 B2
(45) Date of Patent: Jun. 4, 2024

(54) UMO-SOURCED, CLEAN, EFFICIENT, NON-CATALYTIC CRACKING AND RE-REFINING METHODS AND APPARATUS

(71) Applicant: Arizona Fuel Operations I LLC, Scottsdale, AZ (US)

(72) Inventor: Paul S. Moote, Highland, UT (US)

(73) Assignee: Arizona Fuel Operations I LLC, Scottsdale, AZ (US)

(*) Notice: Subject to any disclaimer, the term of this patent is extended or adjusted under 35 U.S.C. 154(b) by 0 days.

(21) Appl. No.: 17/317,685

(22) Filed: May 11, 2021

(65) Prior Publication Data

US 2021/0355391 A1 Nov. 18, 2021

Related U.S. Application Data

(60) Provisional application No. 63/071,170, filed on Aug. 27, 2020, provisional application No. 63/055,594, filed on Jul. 23, 2020, provisional application No. 63/025,785, filed on May 15, 2020.

(51) Int. Cl.
| | |
|---|---|
| *C10G 55/04* | (2006.01) |
| *B01J 19/00* | (2006.01) |
| *B01J 19/24* | (2006.01) |
| *C10G 7/00* | (2006.01) |
| *C10G 9/00* | (2006.01) |

(52) U.S. Cl.
CPC .......... *C10G 55/04* (2013.01); *B01J 19/0026* (2013.01); *B01J 19/2405* (2013.01); *C10G 7/00* (2013.01); *C10G 9/00* (2013.01); *B01J 2219/00247* (2013.01); *C10G 2300/1007* (2013.01); *C10G 2300/202* (2013.01); *C10G 2300/205* (2013.01); *C10G 2300/307* (2013.01); *C10G 2300/4006* (2013.01); *C10G 2400/04* (2013.01)

(58) Field of Classification Search
CPC ................ B01J 19/2405; B01J 19/2415; B01J 2219/0006
See application file for complete search history.

(56) References Cited

U.S. PATENT DOCUMENTS

| | | | |
|---|---|---|---|
| 1,885,387 A * | 11/1932 | Swartz | C10G 9/14 196/107 |
| 1,920,929 A * | 8/1933 | Cross | C10G 9/14 196/116 |
| 2,286,786 A | 6/1942 | Cloyd | |
| 2,443,072 A | 6/1948 | Kaiser | |
| 2,465,964 A | 3/1949 | Brooke et al. | |
| 3,321,380 A | 5/1967 | Hillburn | |
| 3,791,965 A | 2/1974 | Fitzimons et al. | |
| 3,888,743 A | 6/1975 | Fickel | |
| 4,073,719 A | 2/1978 | Whisman | |
| 4,101,414 A | 7/1978 | Kim et al. | |
| 4,302,229 A | 11/1981 | Anderson | |
| 4,406,743 A * | 9/1983 | MacQueen | C10G 29/06 196/100 |
| 5,034,103 A | 7/1991 | Hamer et al. | |
| 5,709,780 A | 1/1998 | Ognisty et al. | |
| 5,738,025 A | 4/1998 | Tachibana | |
| 5,785,819 A | 7/1998 | Kaibel et al. | |
| 5,885,444 A | 3/1999 | Wansbrough et al. | |
| 5,948,211 A | 9/1999 | Yeoman et al. | |
| 6,024,842 A | 2/2000 | King | |
| 7,208,079 B2 * | 4/2007 | Fakhri | C10M 175/0058 208/185 |
| 7,270,316 B2 | 9/2007 | Burch | |
| 8,877,992 B2 | 11/2014 | Appel et al. | |
| 9,359,559 B2 | 6/2016 | Middleton et al. | |
| 10,655,070 B2 | 5/2020 | Wheeler et al. | |
| 2009/0300971 A1 | 12/2009 | Abhari et al. | |
| 2012/0318716 A1 | 12/2012 | Wheeler | |
| 2016/0053184 A1 | 2/2016 | Wheeler et al. | |
| 2016/0130510 A1 * | 5/2016 | Wombles | C10G 7/003 208/184 |

FOREIGN PATENT DOCUMENTS

| | | |
|---|---|---|
| WO | WO2009108761 | 9/2009 |
| WO | WO2014015423 | 1/2014 |
| WO | WO2019116108 | 6/2019 |

OTHER PUBLICATIONS

Wikipedia Notes, https://en.wikipedia.org/wiki/, Disillation, Jun. 16, 2020.
International Search Report and Written Opinion in corresponding PCT Application No. PCT/US2021/032300, dated Oct. 21, 2021.

\* cited by examiner

*Primary Examiner* — Randy Boyer
(74) *Attorney, Agent, or Firm* — Norton Rose Fulbright US LLP (57) ABSTRACT

A process for re-refining used lubricating oil (ULO), much of which is used motor oil (UMO) relies on more rapid heating, turbulent flows, higher peak temperatures, to achieve rapid thermal cracking, even including metal-bearing additives without catalysts, compared to conventional refining of crude oil and conventional recycling processing of UMO. By thermally cracking this way and scrubbing with recycled, processed liquids from the flow stream, a process readily removes metal-bearing hydrocarbons in typical lubricating oil additives. Those bonded metals consigned to heavy fraction "bottoms," are commonly non-removable by other recycling schemes. Long chain polymers including paraffins are broken into lighter hydrocarbons with properties typical of fuels containing olefins, naphthenes, and the like. Data and analysis reveal low solids, effective metal removal, comparatively low viscosity and boiling points, and greatly reduced sulfur content in fuel and oil products resulting.

19 Claims, 1 Drawing Sheet

UMO-SOURCED, CLEAN, EFFICIENT, NON-CATALYTIC CRACKING AND RE-REFINING METHODS AND APPARATUS

RELATED CASES

This application claims the benefit of: U.S. Provisional Patent Application Ser. No. 63/025,785, filed May 15, 2020; U.S. Provisional Patent Application Ser. No. 63/055,594, filed Jul. 23, 2020; and U.S. Provisional Patent Application Ser. No. 63/071,170, filed Aug. 27, 2020. All the foregoing references are hereby incorporated herein by reference in their entirety.

BACKGROUND

The Field of the Invention

This invention relates to refining petroleum products, and, more particularly to re-refining used lubricating oil, such as used motor oil and similar lubricants.

Background

Used lubricating oil (hereinafter, motor oil is used as an example representing all lubricating oils) is typically re-refined to be used again as motor oil. Re-refining is a process that vacuum distills the UMO at temperatures below 650 F (343 C) to preserve the high molecular weight paraffinic lube oil hydrocarbon molecules. The lubrication or "lube" oil additives are mostly separated by distillation into a heavy (high molecular weight) bottom oil cut. The lighter vacuum products can be separated into various grades of lube oil. The products are usually hydro-treated to consolidate and remove the remaining lube oil additives. The re-refined oils are then sold into the base lube oil market where new additives are added so the oil can be sold as finished lube oil.

BRIEF SUMMARY OF THE INVENTION

A new system and method rely on increased flow speeds, more rapid heating, reducing hydrodynamic boundary layers, and related processes to heat feed stocks much faster but not to as high a maximum temperature as conventional methods. One result is greatly reduced, even effectively eliminated carbonization of feed stocks and fouling of heating lines. Used motor oil ("UMO") is initially thermally cracked into lighter hydrocarbons. This step decomposes and concentrates lube oil additives in the heavy hydrocarbon fraction, which can then be removed readily, taking with it the metals. Metals are a major reason lubricating oils are unsuitable for re-refining into fuels, or re-refining at all. Metals are unsuitable as pollutants in fuels, and act as catalyst killers in refinery processes. The ability to economically remove them is of tremendous benefit. Rapid heating without carbonization is beyond conventional methods. Being able to avoid the peak temperatures of conventional re-processing provides multiple benefits. The implementation of systems and processes in accordance with the invention also reduces the sulfur content of the finished oil products and reduces the viscosity of the output products, as well as materials being processed.

DETAILED DESCRIPTION OF THE PREFERRED EMBODIMENTS

It will be readily understood that the components of the present invention, as generally described herein, could be arranged and designed in a wide variety of different structural and process configurations or formulations. Thus, the following more detailed description of the embodiments of a system, product, and method in accordance with the present invention, is not intended to limit the scope of the invention, as claimed, but is merely representative of various embodiments of the invention.

Figure 1:
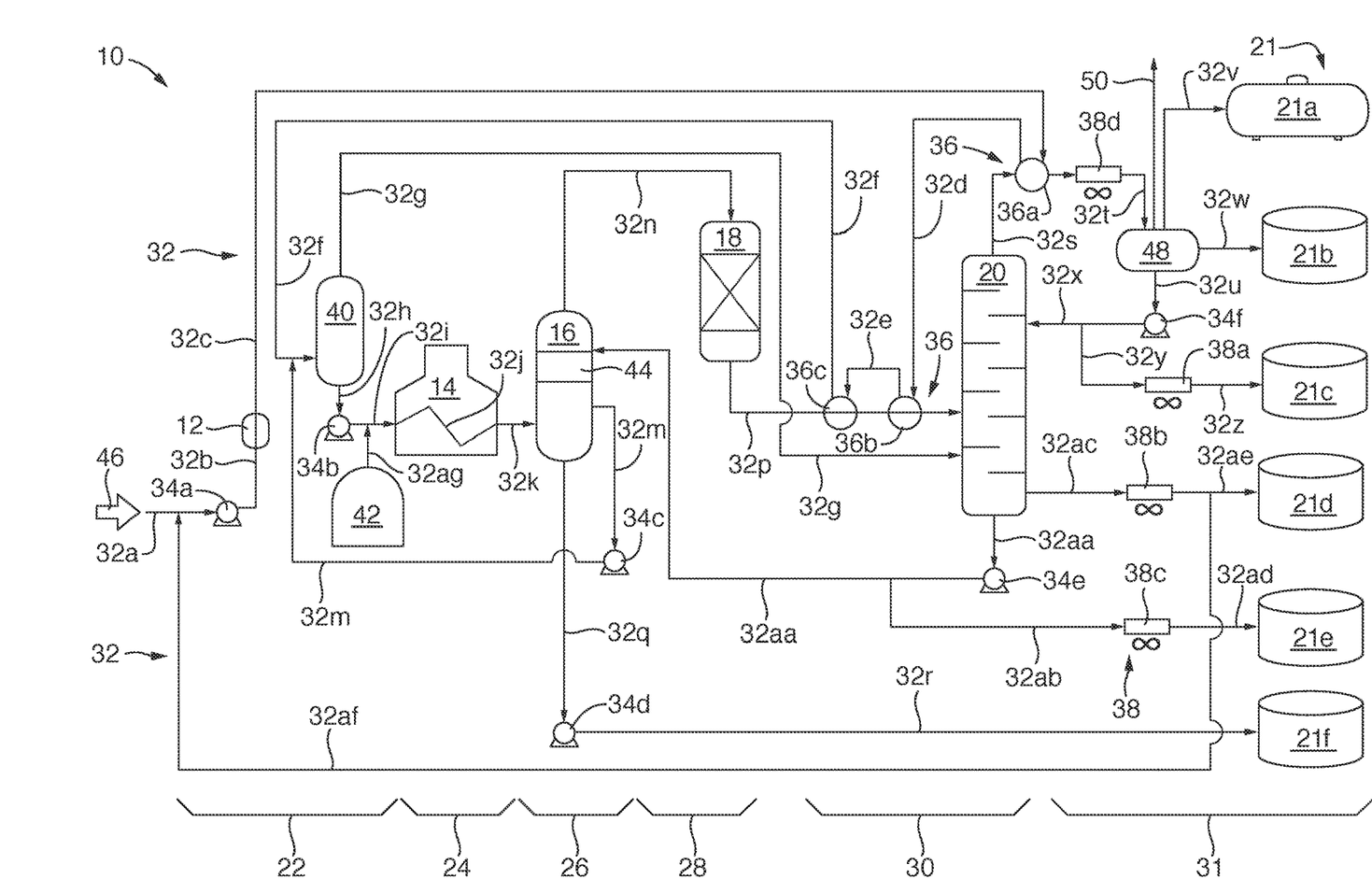
FIG. 1 is a schematic block diagram of one embodiment of a UMO processing facility and method for refining used motor oil into lighter, hydrocarbon species suitable for fuels, while separating out undesirable additives, metals, and excessively heavy species unsuitable for fuels.

Referring to FIG. 1, a system 10 in accordance with the invention may involve several major subsystems, each representing certain processes and processing. For example, a filter 12 along with other components may receive a flow of used oil, typically used motor oil (UMO) or other similar lubricant. As lubricant needs to be recycled, but will not be recycled in a conventional way to a conventional product. That is, for example, in the prior art, used motor oil may be re-purified in order to restore it as a useful lubricant. In a system 10 in accordance with the invention, the UMO is to be refined, typically cracked and distilled in order to reduce the molecular weights of the species contained therein in order to create fuels rather than lubricants. Some amount of heavy species or "bottoms" may be unsuitable for anything other than inclusion in an asphalt mix or the like.

After filtration and other preprocessing, the flow of UMO may pass through a furnace 14 to provide heating rapidly and controlled in order to maintain efficiency and reduce fouling. The furnace 14 will then pass the flow to a separator 16 for an initial separation. The vapors may pass from the separator 16 to a packed bed 18 such as an adsorber 18 in order to detoxify or remove certain undesirable chemical constituents from the flow. Ultimately, the vapors originating in the furnace 14 and passing through the separator 16 will arrive at a distillation column 20.

Typically, a fractional distillation process 20 may be best suited for the subdivision of the comparatively larger molecular weights of the UMO into the smaller or lesser molecular weights needed for fuels. The distillation column 20 will output various species of various ranges of molecular weights having differing ranges of evaporation temperatures. These different output materials will then be passed on for some amount of post processing 31 into storage containers 21a-21f and ultimately disposition in a market.

In the illustrated embodiment, one may think of the different sub steps or sub processes 22-3D and 31 as an initial or pre-processing 22 followed by heating 24 to cracking temperature in the furnace 14. Thereafter, the flow is passed into the separator 16, which separates 26 certain of the most undesirable materials, such as the metals and metal-containing species that must be flushed or scrubbed from the vapor stream 32K entering the separator 16.

A packed bed 18, is an optional component in order to clean 28 or detoxify 28 (scavenge 28 from) the flow of vapors leaving the separator 16 and destined for the distillation column 20. Accordingly, certain particularly noxious or otherwise undesirable substances, such as, for example, sulfur, may be cleaned 28 (e.g., scavenged 28) from the flow 32n, 32p of vapor entering the distillation column 20 for purposes of fractional distillation 30 or other refining 30. Post processing 31 may typically involve cooling and storing outputs from the separating 26 and distillation 30 processes. From the tanks 21 further processing 31 may occur, but typically need not. Rather, dispensing or disposition of the content of the various tanks 21 may be passed directly into markets at market values.

For purposes of discussing the components, their functions, and the resulting processes in a system 10 in accordance with the invention, various flows 32 are indicated by lines 32. For example, lines 32 include 32a through 32k, lines 32m and 32n, and 32p through 32z, and 32aa through 32af designate flows 32a through 32ag flowing therein. Letters "o" and "l" are unused to save confusion and will not be included hereinbelow regarding the connection between components by these lines 32. A trailing letter is a specific instance of the number it follows. Any instance may also be considered one of that number.

Various pumps 34 are either necessary or useful for increasing pressures downstream thereof and decreasing pressures upstream thereof in order to promote flows 32 of fluids, where fluids may be gases, liquids, or two-phase combinations of both liquids and gases. Herein, a vapor is a gas. That is, vapor is typically a word applied to a vapor phase or gas phase of a material that is typically liquid at ambient temperature and pressure. Ambient temperature and pressure may also be referred to as standard temperature and pressure (STP). Herein, pumps 34a through 34f provide motive forces and pressures for moving various flows 32 throughout the system 10.

Likewise, various heat exchangers 36, typically configured as recovery heat exchangers 36, including exchangers 36a through 36c. Recovery heat exchangers 36 may draw heat out of a flow that needs to be cooled for its next processing, and transfer that heat into a flow that needs to be preheated for subsequent processing in a hot or heating process. Thus, the heat exchangers 36 transfer heat from a comparatively hotter flow (higher temperature) to a comparatively cooler flow (comparatively lower temperature).

Condensers 38 are actually heat exchangers, technically. Nevertheless, condensers 38, including condensers 38a through 38c, need not recover heat, but rather simply rely on heat transfer into ambient conditions such as ambient air for a flow 32 to be cooled. Similarly, some condensers 38 may actually rely on ambient liquids, such as water to improve heat transfer rates out of a comparatively hotter fluid flow to be cooled before subsequent storage or other disposition.

One will note a flash drum 40, constituting yet another type of heat exchange. The flash drum 40 typically operates on the basis of either adding heat, or simply dropping pressure on a preheated flow. In either event, the liquids of certain species, typically water and glycol, will immediately vaporize within the flash drum 40. Other liquids having a higher boiling point will remain liquid and pass out through a bottom end of such a flash drum 40. Typically, a flash drum 40 may also evaporate certain comparatively lighter species having comparatively lower molecular weights, such as aromatics or other volatile hydrocarbons (VHC). Volatile hydrocarbons are sometimes referred to as volatile organic compounds (VOC), inasmuch as organic is a term referring to carbon-based compositions. Hydrocarbons are certainly carbon-based constituents.

In the illustrated embodiment, a boiler 42 may receive water in order to provide a specific "quality" of steam added to an incoming flow received by the furnace 14. That is, the furnace 14 is typically a tube-and-shell or tube-in-shell type of heater 14 or heat exchanger 14. Thus, just as many old or steam engines at the beginning of the steam age of power included a fire box through which were passed tubes of liquid water destined to vaporize into steam, a boiler 42 may provide a flow of steam.

However, in the thermodynamics of water, and other liquids, temperature and pressure control the thermodynamic quality of the vapor. Quality is defined in terms of the fraction of a vapor in a two-phase mixture of the liquid phase and the vapor phase of the material. Typically, a steam quality of one hundred percent or steam quality of one represents steam that is at a sufficiently high temperature for the pressure it is under to remain entirely in the vapor phase. Similarly, a quality of zero means that the pressure and temperature combination in a flow, such as water, is such that all of the flow remains condensed into a liquid phase.

Meanwhile, throughout processing, reducing pressure converts more liquid to vapor. Adding heat to increase temperature while maintaining a given pressure, may also cause the quality to rise, meaning that more of the liquid is converted to vapor. Thus, the boiler 42 may actually produce a specific quality of steam, which then may enter the incoming flow to the furnace 14.

A furnace 14 has two flows. A flow of combustible materials or the exhaust products of a reaction thereof will enter a furnace 14. These will exit as an exhaust, having given up much heat to the flow 32j in the line 32j, which does not mix with the combustion products. Raising the temperature of the flow 32j "cracks" hydrocarbon molecules of higher molecular weight into shorter, lower molecular weight, molecules.

Boiling temperatures depend on pressure. Pressure and temperature are both controlled in accordance with the invention. Accordingly, boiling temperatures of various species being refined into lower weight species, are referenced to atmospheric pressure unless otherwise specified for some specific instance.

Conventional lubricant-recycling processes intentionally maintain temperatures (typically less than 550 degrees F.) well below "cracking values" (typically temperatures over 650 degrees F.) for legitimate reasons. The objective of such processes is to maintain intact the long chain molecules (high molecular weights) valuable for lubrication. Lubricants are recycled to lubricants. Such a process also leaves the "additives" intact and dispersed within a "heavier fraction" or long chain molecules. For example, a thin film evaporator may apply a vacuum to oils at about 550 degrees F., evaporating about 80 percent of the molecules, while leaving about 20 percent "bottoms" or "heavy fraction" to be disposed of as a low value product. This renders the metals bound into the additive molecules effectively impossible to separate. Instead, such molecules must be disposed of with the heavy fraction, typically about 20 percent, constituting "bottoms" or sludge destined for use as asphalt additives, roofing tar additives and the like.

On the contrary, in a system 10 in accordance with the invention, the exit temperature achieved by the flow 32j in the furnace 14, exits as the flow 32k at a temperature selected and controlled to meet output product parameters. For example, the temperature of the flow 32k determines both the fraction of the incoming feed flow 32i that is cracked into lower molecular weights, and the length (molecular weights) of the cracked output. In general, higher temperature and energy consumption are required to crack an input flow 32i into comparatively smaller molecular weight molecules. Again, the system 10 may operate the furnace at a range of temperatures based on the desired output product. Also, above 950 degrees F., fouling of lines 32 due to coking (carbonization) become problematic, and are avoided in a system 10 and process 10 in accordance with the invention. Thus, a range of from about 650 F to 900 F has been found suitable with a target of about 750 F (400 C).

Typically, the system 10 may operate with a flow 32k temperature of from about 750 F (400 C) degrees F. to about 950 F (510 C). Within this temperature range, studiously avoided by conventional UMO recycling processes, the UMO lubricants are cracked, and thus no longer useful at lubricants. However, the additives are also cracked, releasing their metallic constituents, which are then no longer chemically bonded, nor miscible with the hydrocarbons. Those metallic constituents drop out of the separator 16 to exit into the flow 32q. Instead of having 20 percent of input becoming bottoms, long chain molecules of inseparable metal-containing hydrocarbons, the system 10 outputs a flow 32q constituting only from about 3 percent to 10 percent of the input flow 32a. This recovers much of what would otherwise be low value bottoms, and may even use bottoms from conventional processes as all or part of the input flow 32a.

As a convenient reference "large molecular weight" molecules typically boil (vaporize) at from about 700 F (370 C) to about 1300 F (704 C). Cracked (lower molecular weight) molecules typically boil at from about 100 F (380 C) to about 700 F (370 C). Also, some "heavier molecules," heavy fraction, or bottoms will continue to crack into species similar to the original molecular weights of the UMO principal molecules. Those resultant molecules, may be "high value" products, no longer containing their "catalyst poisoning" metals, as heavy fuels for marine use, or as input products for further conventional refining, where catalytic cracking is a key to reducing energy costs.

One will note likewise that the separator 16 includes a grid 44. Typically, screens, a packed bed 18, a series of trays, various baffling, or other types of solid media may be included in a separator 16. It may serve to trap liquids and pass vapors rising through it. It may also provide a condensing surface on which certain vapors may condense into liquids and mix. That is, rather than allowing a liquid to freefall through a vapor, surface area available to exchange heat, chemical species, or otherwise process, may be facilitated by the presence of a grid 44.

Nevertheless, the grid 44 may be configured as a tray, screen, or the like, or a particular shape of solid objects having a suitable porosity (void fraction and surface area). Given a particular volume or mass of solid material may encourage a comparatively large surface area effective to trap liquids, thus providing an increase in both droplet interdiction as well as contact area between vapor phase materials to be condensed into liquid phase materials passing through the separator 16.

In a similar way, a scavenger 18, such as a packed bed 18 or adsorber 18 may operate as an optional separation system 18 or cleaner 18 to remove particularly toxic or otherwise undesirable constituents. It may also have a coating on particles, such as granules, beads, small porous objects, or the like. Such a coating has a chemical constitution capable of attracting the undesirable component desired to be removed from the flow. Thus, the scavenger may be regenerated by periodically drawing out the undesirable material by heating or a caustic wash.

In general, one may think of a system 10 as executing a process 10 as well. Thus, for example, FIG. 1 indicates both a structural system made up of components 12, 14, 16, 18, 20, 21 as well as a process and order of steps 22, 24, 26, 28, 30, 31 for processing a flow. An incoming flow through the line 32a may pass into a pump 34a pressurizing the incoming flow 46. In the illustrated embodiment, the flow 46 enters as a liquid feed 46 in a line 32a or flow 32a made up of a mixture of various lubricants, such as used motor oil.

A filter 12 at the end of a line 32b from the pump 34a may filter out solid materials that may be entrained or otherwise contained within the flow 46. For example, metal shavings, dirt, grit, and the like may be removed. For example, various types of replaceable or reusable filters may involve centripetal cyclones, packed beds of particles, surface coatings or porosities, papers, plastics, polymeric nonwoven fibers. Sieve (molecular, or physical grids), or the like.

Following an initial filtration in the filter 12, a line 32c carries the flow 32c to and through a heat exchanger 36a. From the heat exchangers of 36a, the flow 32d exits having picked up heat received from output 32s from the distillation column 12 by way of the line 32s. A heat exchanger 36, generally, extracts and adds (exchanges) energy recovered from the back end of the processing system 10. Ultimately, the line 32d leaving the heat exchanger 36a carries the flow 32d through yet other heat exchangers 36b, 36c as illustrated, connected by a line 32e. General considerations for design of heat exchangers 36 will apply here.

Ultimately, the line 32f returns pre-heated flow 46 into a flash drum 40 or other separation system 40. One function of the flash drum 40 is as a flow 32g to remove water and glycol, typical pollutants picked up by UMO in its principal function as a lubricant. For example, the cooling system of a vehicle engine will usually contain water and glycol. Meanwhile, the environment itself in which an engine operates will also tend to bring in water vapor, condense it, and contain it in the bottom of an oil sump in an engine.

Thus, typically, between one and ten percent by weight of water and glycol may be found in UMO flows 46. The flash drum 40 or other separator 40 will typically need to heat the flow 46 to between about 200 F and 600 F. The pre-heating in the heat exchangers 36a, 36b, 36c saves energy required to operate the flash drum 40 or other separator 40 effectively and efficiently. Efficiency, for practical purposes, in the flash drum 40, will typically be the amount of energy added by the flash drum 40 (or other component), compared to the overall energy required to be added by all mechanisms, including heat exchangers 36. Thermodynamic efficiency (see any dictionary definition) is also a suitable expression of efficiency.

Leaving the flash drum 40 or other separator 40 is a line 32g passing water and glycol out as vapors, along with other highly volatile (low boiling point) materials, including non-condensable" gases like air, and certain hydrocarbons. All may pass into the distillation column 20. Similarly, an exit line 32h from the separator 40 may also pass the remaining liquids of the flow 46 into a pump 34b leading directly into the line 32i feeding the internal tubes 32j or lines 32j inside the furnace 14. Thus, the flash drum 40 separates vapors, substantially all materials existing in a vapor state, to go out the line 32g to the distillation column 20. The lower exit line 32h passes liquids into the pump 34b and ultimately through the furnace 14 for heating to "cracking" (disassociation) temperature.

The furnace 14 typically operates at a combustion temperature of the fuel being burned therein. Fuel for firing the furnace 14 may actually come from any external or internal suitable stream 32. For example, many of the fuels produced to the various reservoirs 21 at the terminal end of the process may be suitable for burning. Gases may be "flared" more efficiently (with more air and mixing) inside the furnace 14.

Even heavier species collected in the reservoirs 21 or tanks 21 as storage 21 may be adapted to a furnace 14, and vice versa.

That is, the burners of the furnace 14 may be jetted, aerated, aspirated, injected, or otherwise adapted, to the fuel firing the furnace 14. Many of the fuels in the storage tanks 21 may be suitable for combustion. In fact, the furnace 14 may have multiple burners in order to be able to use whatever output products from the system 10 might be most easily or inexpensively available for firing the furnace 14.

As an incidental issue, a line 32$m$ may be pumped by a pump 34$c$ in order to recycle certain materials from the separator 16. The separator 16 is downstream from the furnace 14, and may discharge through the line 32$m$ by means of the pump 34$c$ as a motive means 34$c$ to feed into the line 32$f$ passing into the flash drum 40 or similar separator 40.

As a practical matter, the flow 32$k$ is controlled by the temperature and pressure therein and the pump 34$b$. Typically, the line 32$i$ feeding into the furnace 14 is fed steam from a line 32$ag$ from the boiler 42. The boiler's 42 function is to produce a desired quality and volume of steam to be mixed with the flow 32$c$ providing specific properties. Specifically, the velocity and volumetric flow rate in the line 32$i$ may be maintained as a two-phase flow. This means that a controlled amount of water vapor as part of the steam quality control in the line 32$ag$ is balanced with a liquid fraction of the steam 32$ag$. Volumetric flow rate may be used to control velocity of the flow through the lines 32$i$, 32$j$.

The functionality of the boiler 42 provides a two-phase flow in the line 32$j$ whose temperature and pressure control speed of passage by the volumetric flow rate. It has been found valuable, for example, in modeling and prototyping a system 10 in accordance with the invention to maintain the precise volume (by the quality) of steam. Temperature and pressure in the line 32$i$, control quality, and therefore the volumetric flow rate and speed through. For example, about two thousand feet of line 32$j$ pass through one embodiment of the furnace 14. The diameter of lines 32$j$ velocity may be controlled in order to give a Reynolds number well above 2100 corresponding to highly turbulent "plug flow."

Plug flow represents a comparatively-high-speed flow velocity in a highly turbulent flow regime, defined in terms of its Reynolds number (NO of several thousand (e.g. 3000 to 5000 or more), well known in handling fluids. The Reynolds number is the density of flow multiplied by its velocity and a significant length, typically a dimeter, or effective diameter (hydraulic diameter is 4 times cross-sectional area divided by perimeter), in a closed line 32, divided by the viscosity. Of course, as any engineer or technician understands, the Reynolds number is a dimensionless quantity. The specific "units" of each foregoing parameter must be compatible (consistent) with those of other parameters in order to have no units in a "dimensionless" Reynolds number.

Typically, laminar flow exists in flows below a Reynolds number value of about 2100. In contrast, turbulent flow is above 2100, with extremely turbulent flow being above a 5000 value Reynolds number. Thus, it has been found that maintaining a plug flow well above 2100 and preferably nearer 5000 provides a better velocity distribution (substantially flat) across the line 32$i$, and inside the line 32$j$ or lines 32$j$.

For example, the velocity profile that may exist in some lines 32 subject to laminar flow will typically have a comparatively large "boundary layer" of velocity transition near a wall. Laminar flow results in a profile having a long nose, shaped like the front of a jet airplane or the front of a round-nosed bullet. Turbulent flow, on the other hand, has a much flatter (more constant, equal velocity) profile across the flow. It has a thinner boundary layer (velocity differential from zero to the central or free stream) near the wall.

Ultimately, plug flow is of such vigorous velocity with respect to the line in which it passes, that the boundary layer occupies a very small fraction, negligible for practical purposes, of the flow, and only exists near the wall of the line 32. Meanwhile, the bulk of the flow 46 (e.g., 32$j$) thus has an almost flat (constant velocity) profile. Virtually all of the flow 46 except that very close to the wall is tumbling, in a turbulent fashion, mixing, preventing any fluid staying near the wall long enough to carbonize, and maintaining a forward velocity nearly equal across the entire cross section.

It has been found in previous prototyping that maintaining the controlled two-phase flow 46, thereby maintaining the velocity profile within the line 32$i$ and the line 32$j$, substantially aids in reducing fouling (deposits in the line 32$j$). Likewise, heating rapidly to a temperature of from about 750 F (400 C) to about 950 F (520 C) in the line 32$j$ helps prevent fouling prevalent when flows are instead quiescent (free convection) or laminar in nature. For example, a comparatively lower Reynolds number, below 2100, thickens the boundary layer leading to a permanent fouling, a deposition of solids. This obstructs heat transfer through the resulting coating of sediments, mixtures thereof with heavy hydrocarbon species, carbonized (coke) solids on inner walls of the lines 32$j$. This immediately reduces heat transfer, and increases resistance to heat flowing into the flow 32$j$.

A residence time or dwell time inside the lines 32$j$ of from about one minute to about twenty minutes keeps the furnace 14 efficiently operating. A Reynolds number in the plug flow region (well above 2100, preferably near or over 5000) works best. One current embodiment of a furnace 14 in accordance with the invention includes 2000 feet of line 32$j$ operating at between 200 PSIG (1.4 MPa) to about 400 PSIG (2.76 MPa).

Exiting the furnace 14, a flow 32$k$ in line 32$k$ (herein, each item 32 with a trailing alphabet character represents a line, and the flow in that line) enters the separator 16. The separator 16 operates by a falling flow received through the line 32$aa$. The separator 16 operates as a "scrubber" 16 in which vapors 32$k$ are scrubbed by liquid flows 32$aa$ arriving in the line 32$aa$. A pump 34$e$ pumps materials of high boiling point (distillation bottoms 32$aa$) descending through the distillation column 20 or fractional distillation column 20 and out. Thus, the pump 34$e$ drives the flow 32$aa$ through the line 32$aa$ to be passed back through the separator 16, passing through the grid 44 thereby comminuting into droplets of smaller sizes, and falling down as a liquid spray through the upward flow 32$k$ through the separator 16.

The grid 44 also assures that vapors rising upon their release from the line 32$k$ into the scrubber 16 or separator 16 must pass through comparatively small effective diameters along a tortuous path through the grid 44. Intimate exposure to liquids will scrub out any entrained droplets not truly in a vapor phase. Vapors exit out the line 32$n$ as a flow 32$n$ directed into an optional scavenger 18. The scavenger 18 may be characterized as a detoxifying bed 18, an adsorber bed 18, or other packed bed 18. A function of this scavenger 18 is to remove toxic or otherwise undesirable substances, notably sulfur. Different types of scavengers operate on different mechanisms. One currently contemplated embodiment provides a packed bed 18 of solid materials, on the surface of which are chemicals that will react with or collect toxins like sulfur atoms. Accordingly, vapor phases in the flow 32*n* pass through the scavenger 18, giving up sulfur or other selected atoms or molecules undesirable in a finished product.

In the illustrated embodiment, a typical scavenger 18 may be renewed or regenerated by heating, by back flushing, by a caustic wash, or the like. Regeneration removes the toxic or undesirable atoms and molecules previously removed by the scavenger 18. Used lubricating oil (ULO) flows 46 typically contain about 2500 PPM of sulfur. The system 10 was successful in separating out about 80 percent of sulfur in the bottom flow 32*q* exiting the separator 16, and from the vapors in the flow 32*n* passing through the scavenger 18.

Thus, sulfur content in the storage containers 21 may be down to about 500 PPM or less, sometimes less than 100 PPM. Synthetic lubricants may include nearly zero percent (e.g., one to five PPM) sulfur. Naturally occurring petroleum contains from about 20,000 PPM to about 100 PPM, and 500 PPM is typical for lubricating oils before inclusion of their additives. Thus, a quantity less than 500 PPM is highly desirable. Nevertheless, even lower quantities in parts per million have been achieved in prototypes in accordance with the invention.

The separator 16 also discharges a selected quantity of liquid flow 32*m* through the line 32*m*. This liquid flow 32*m* is driven by a pump 34*c* in the line 32*m*, eventually arriving back at the flash drum 40 after mixing into (with) the flow 32*f* to help drive off water content. It brings thermal energy and cuts the fraction of UMO (ULO).

The bottom flow 32*q* exiting the separator 16 is primarily comparatively heavy species (long chain molecules of high boiling point and most metal-containing molecules resulting from cracking), pumped by the pump 34*d*. It eventually passes through a line 32*r* into storage 21*f*. These bottoms 32*q* or bottom flow 32*q* represent heavy species and the vast majority (over 90 percent) of metals from cracked additives from the UMO.

Additives include numerous types of molecules containing metals. These metal based hydrocarbons typically contain certain metal atoms in place of hydrogen atoms or other atoms within a hydrocarbon structure. For example, zinc dialkyldithiophosphate is a friction reducer useful where metal-to-metal contact occurs. Thus, the metals within the molecules provide additional tribology (wear) protection. That is, wear protection is improved by slight amounts of metal bound up in hydrocarbon molecules.

Similarly, antioxidants such as trilaurylinithiophosphate ($C_{12}H_25S3P$) and metal sulfonates may act as rust and corrosion inhibitors. Likewise, viscosity improvers and other long chain molecules as adhesion agents and anti-wear agents may include organic sulfurs. Detergents may include phenolates, magnesium, calcium, barium, phosphates, and sulfonates. Similarly, anti-foaming agents, dispersants, friction modifiers such as phosphorous compounds, pour point depressants (to provide reduced viscosity at comparatively low ambient temperatures), demulsifiers, emulsifiers, and biocides may all be included. These additives are all difficult to remove, and are typically not removed in UMO recycling processing. Lacking these artificial constituents, raw crude refining does not have to deal with these problem chemicals.

Metals from UMO additives are verboten in conventional refineries as catalyst killers. In fact, the metals are poisons rendering ineffective catalysts in conventional, catalytic "cat crackers." Classical refineries use catalytic cracking in order to reduce the threshold temperature required to break molecular (interatomic) bonds in long-chain polymers. Temperature presents the problem of coking (boiling off volatiles, leaving solid carbon particles), and certain distillation control issues. Thus, catalytic cracking in conventional refineries reduces refining temperatures and threshold energies required to break polymer chains. This helps improve yields of lighter species having lower boiling points. Metal atoms in hydrocarbon molecules as "additives" should never pass over catalysts, which are also typically metals.

Thus, the separator 16 drops the cracked additive molecules, heavier for containing metals, into the "bottoms" flow 32*q*. The separator 16 input flow 32*k* contains superheated vapor (heated above the boiling point to vapor at 100 percent quality). That vapor will exist in the separator 16, relieved from pressure within the input line 32*k*. In the separator 16, the flow 32*k* largely passes out the exit 32*n* into the scavenger 18.

Meanwhile, some residual liquids pass through the flow 32*m* and pump 34*c* to be returned into the flash drum 40. The long chain polymers and metal-bearing molecules, together with other additive materials in cracked molecules exit through the flow 32*q* and pump 34*d*. These pass through the line 32*r* as a flow 32*r* to be stored in the tank 21*f* for use as constituents of asphalt or the like. Certain molecules may exist in the flow 32*r* that qualify as heavy fuel oils. The "bottoms" flow 32*r* is suitable for inclusion in asphalt types of tar products.

The separator 16 receives a flow 32*aa* from the bottom of the distillation column 20. A pump 34*e* provides the motive force in the line 32*aa*. Also, a valve may control the division of flows 32, diverting a certain amount of the flow 32*aa* into the flow 32*ab* destined to pass into a storage unit 21*e*. In that regard, a condenser 38*c* may help to cool, and possibly condense any vapor fractions such that the flow 32*ad* into the containment 21*e* is effectively a liquid motor fuel (LSMF).

The flow 32*x* in the line 32*x* controls the temperature of the exit flow 32*s* out of the top of the column 20. The flow 32 *x* is typically cooler (in a range around about 100 F, 38 C). The flow 32*f* exits at a temperature in a range about 300 F (150 C) The flow 32*y* in line 32*y* is controlled by how much purging is desired out of the separator 48. For example, a level control in separator 48 may control a valve in the line 32*y*. The flow 32*y* into the tank 21*c* is typically a fuel such as gasoline. Otherwise, the remainder of any flow 32*u* goes into the column 20 through the line 32*x*.

Similarly, a valve in the line 32*ab* controls that flow 32*ab* based on maintaining the bottom level in the column 20. All other flow in the line 32*aa* passes into the separator 16. Meanwhile, the default for the line 32*ac* is to send all that flow 32*ac* into the line 32*af*, unless a draw is desired through the line 32*ae* into the tank 21*d*. In typical operations, a valve into the line 32*f* is always open and a valve into the line 32*ae* is closed.

The distillation column 20 is responsible for a fractional distillation process 20, 30 performed on the principal output flow 32*p* exiting the scavenger 18. Of course, the scavenger 18 is optional. Nevertheless, it can substantially improve (reduce) the sulfur content in the flow 32*p*. The flow 32*p* into the distillation column 20 parallels, to a certain extent, the vapor flow 32*g* exiting the flash drum 40. These two flows 32*g*, 32*p* and recycled flow 32*x* thus provide the content on which the distillation column 20 will operate. In the illustrated embodiment, the flows 32*c*, 32*d*, 32*f* pass through heat exchangers 36*b*, 36*c*, providing recovery (recapture) heat exchange between the flow 32*p* and the flow 32*d* (which is maintained as the flow 32*e*, and the flow 32*f*).

Typically, the flow 32*g* will pass at a temperature of about 540 F (282 C), while the flow 32*p* will pass in at a temperature sufficient to preheat the flow 32*d* from about 230 F (110 C) to about 540 F (282 C). A temperature of over 700 F (371 C) at the exit line 32*k* from the furnace 14 has been found suitable execute all the functions. That temperature declines only tens of degrees or less throughout subsequent flows 32*m* and 32*q* exiting the separator 16, and line 32*p* into the column 20.

The distillation column 20 performs a fractional distillation 20 on the combined flows 32*g*, 32*p*, 32*x* thereinto. In that regard, some amount of the exit flow 32*s* exiting as vapor from the distillation column 20 may also be recycled back through the line 32*s*, heat exchanger 36*a* and condenser 32*t*. It arrives at a flash drum 48 passing a flow 32*u* through a pump 34*f* pressurizing it back into the distillation column 20 as a flow 32*x*.

Typically, certain "non-condensable" flows 50 may pass from the flash drum 48. This recycling of the flow 32*s* back as the flow 32*x*, may provide for separation of non-condensables 50 that may be discharged, as well as fuel gases 32*y* that may be contained in a tank 21*a*. Such fuel gases 32*y* may include methane, ethane, butane, propane, and the like. In certain embodiments, the fuel gases 32*y* contained in the tank 21, or otherwise buffered mechanically, may feed the furnace 14. In some refinery processes, such gases 32*y* may be flared. However, passed into a furnace 14, such fuel gases 32*y* may improve the overall efficiency of the process 10 in a system 10 in accordance with the invention.

The distillation column 20 is responsible to distill constituents from the flows 32*p* and 32*g* as well as any of the flows 32*x* arriving thereat. The comparatively lighter fractions, that is, the lower molecular weight constituents, will have passed out through the flow 32*s* as vapors. Constituents capable of condensing will be passed out through similar flows 32*s* from the distillation column 20.

The bottoms 32*aa* pumped out by the pump 34*e* as the flow 32*aa* may be divided between some fraction, destined to operate as the sprayed (scrubbing) liquid flow 32*aa*, and a flow 32*ab* as a liquid constituting comparatively heavier constituents of the highest molecular weights. In certain embodiments, the flow 32*y* may subdivide off a flow 32*x* representing fuel oils, cool in a condenser 38*a* to ultimately pass through the line 32*z* to a holding tank 21*c* for fuel oils.

The flow 32*ac* may be split between the flow 32*ae* going directly to storage 21*d*, and a recycling flow 32*af*. Flow 32*af* passes back into the line 32*a* as part of the feed 32*a* pumped 34*a* into the flash drum 40 near the beginning of the process 10. One should note that these flows 32*ab*, if divided between flows 32*ab* and 32*ad*, may be further condensed by the condensers 38*c*, 38*b*, respectively, as fuel oil flows 32*ad* and motor fuels 32*ae* in the storage containment 21*c*, 21*e*.

Meanwhile, the output flow 32*s* from the column 20 may be cooled, possibly condensed by the combination of the heat exchanger 36*a* removing heat from the flow 32*s* and passing it into the flow 32*d*. Likewise, the condenser 38*d* cools the flow 32*s* before passing it into the flash drum 48. The drum 48 may remove certain noncondensables in the flows 32*v* and 50 before passing on the liquid flow 32*u* through the pump 34*f* back into the distillation column 20. Again, some portion of the flow 32*x* may be divided off as the flow 32*y* into a condenser 38*a* feeding a line 32*z* with a flow 32*z* to be stored 21*c* in a storage container 21*c* as a comparatively light, straight, naphthenic material such as gasoline or other light fuels.

The flash drum 48 may also feed the line 32*w* with a quantity of water driven off from the incoming flow 32*t*. This may amount to a substantial flow 32*w* to be stored 21*b* in some type of a containment 21*b* for further disposition, whether purification, reuse, or the like.

Of course, the fractional distillation column 20 may separate many different constituents. In the illustrated embodiment, because the metal-containing constituents from the used lubricants such as used motor oil (UMO) have been separated out by the separator 16, it may permissible to use catalysts in additional separation processes, or even in the distillation column 20. However, in the illustrated embodiment, catalytic cracking is not required, partially due to the elevated temperature of the flows 32*k*, 32*p*, fed from the lines 32*j* traversing the furnace 14.

One will note that the distillation column 20 may pass various "bottoms" constituents out through the flow 32*aa*. Although some portion may pass as a liquid to the separator 16, to scrub an incoming flow 32*k*, another portion may be divided as the flow 32*ab*. The flow 32*ab* passes out through condenser 38*c* as a fuel oil flow 32*ad* or other motor fuel 32*ad*. Likewise, a flow 32*ac* represents fuel cooled in a condenser 38*b*. This becomes a flow 32*ae* stored 21*d* with a portion flowing 32*af* into the feed lines 32*a*.

It has been found that a comparatively robust system 10 may pass a flow 46 of about 3000 barrels (600,000 liters) per day. Meanwhile, the filter 12 will operate on the incoming flow 46, through the lines 32*a*, 32*b* to filter out particulate metals, sediment, and other solid particles. The filter 12 is not responsible to scavenge metals, or crack long chain molecules into shorter molecules. Thus, the flow 32*c* through the heat exchangers 36*a*, 36*b*, 36*c* will return a flow 32*f* directly into the flash drum 40 for dehydration of water, glycols, and the like from the petroleum products.

Typically, the flow 32*h* of liquids exiting the flash drum 40 will arrive at the furnace 14 at a temperature of about 540 F (282 C). Meanwhile, the flow 32*ag* from the boiler 42 into the line 32*i* will typically arrive at a suitable temperature, as saturated steam 32*ag* (0<quality<1). Thus, the volumetric flow rate through the furnace 14 in the line 32*j* will be controlled as to its velocity, in order to maintain the highly turbulent flow required.

Exiting through the line 32*k* at a temperature of from about 850 F (454 C) to about 925 F (496 C), the flow 32*k* will vaporize in the separator 16, cracking long chain polymers into shorter chains. Metal bearing molecules descend to the bottom flow 32*q*. A vapor flow 32*n* may exit at from about 700 F (371 C) to about 800 F (427 C), following cracking. The exit flow 32*q* may eventually pass onto its container 21*f* at about 130 F (55 C). Typically, the pump 34*d* drives a flow 32*r* that is comparatively small. The flows 32*ac* and 32*ad*, in contrast, may typically be about 360 barrels (72 m$^3$) per day and 2130 barrels (426 m$^3$) per day, respectively.

Likewise, fuel gas flows 32*v*, originating from flow 32*s* from the column 20, will typically leave a flash drum 48 at about 25 psi gauge (PSIG) (172 KPa). The flash drum 48 also discharges about 150 barrels (30 m$^3$) per day of water in the flow 32*w* to be contained in the container 21*b*. The condenser 38*a* outputs through the line 32*z* into the containment vessel 21*c* the light, straight-run oils at a rate of about 450 barrels (90 m$^3$) per day.

The condenser 38*b* runs at about 180 F (82 C) to condense the flow 32*ae* stored in the container 21*d*, while the condenser 38*c* operates at about 130 F (54 C) to cool the flow 32*ad* headed to the container 21*e*.

In certain selected embodiments of a system 10 implementing a process 10 in accordance with the invention, the flow 32*j* through the furnace 14 in the heating lines 32*j* may be about 2000 (610*m*) feet long. The incoming flow 32*f* is preheated to about 540 F (282 C) for flashing in the flash drum 40. The dehydration of water, glycols, and similarly situated liquids, vaporized out of the flow 32*f* leaves a liquid flow 32*b* pumped 34*h*, into the furnace 14. The liquid 32*h* combined as a flow 32*i* with water as a saturated liquid and vapor flow 32*ag* from a boiler 42 was at about 540 F (282 C) in tests.

The line 32*j* inside the furnace 14 is typically exposed to the flame temperature of a fuel gas 32*v*. Thus, a temperature within the furnace 14 will be maintained by matching heat input with the heat transfer taken through the wall of the line 32*j* into the flow 32*j* contained therein. Simply put, heat input is fuel mass times reaction energy of combustion. This will equal combustion mass flow rate times specific heat and its temperature drop from the flame temperature. Thus, a temperature rise in the line 32*j* of from about 540 F (282 C) to about 850 F (455 C) to 925 F (496 C) will permit cracking of comparatively longest chained molecules (e.g., metal-bearing additives, into shorter chain (lower molecular weight) molecules in the separator 16.

Moreover, the cracked, residual, metal-containing hydrocarbon molecules will tend to be very short, often immiscible. They are heavier than similarly situated, purely hydrocarbon molecules of equal molecular lengths. The resulting bottom flow 32*q* exiting the separator 16 will carry away not only hydrocarbons of greatest molecular weight, but smaller chain hydrocarbons having maximum weight due to their contents of metal.

This differs substantially from conventional refining systems wherein temperatures are not sufficient for cracking the flow 32*k* exiting a furnace 14. In fact, kettle types of furnaces, do not elevate the temperature of the entire flow sufficiently, because it continues to mix with incoming flows, thus limiting (reducing) temperature of outgoing flows. In the illustrated embodiment, the entire flow 32*j* is elevated to the same maximum exit temperature to aid in cracking within the separator 16.

The flow through the line 32*j* is comparatively rapid. It may occur in a matter of from a few minutes, up to about twenty minutes. There is no languishing of the flow, but a turbulent, plug flow through the line 32*j* at all times. This avoids coking by overheating at the heated wall, while providing a comparatively rapid increase in temperature continually along the entire path of the flow 32*j*.

Typically, the separator 16 acts as a viscosity breaker or thermal viscosity breaker. This thermal viscosity breaker 16 or thermal cracker 16 operates from about 850 F (455 C) to about 950 F (510 C). Thus, the time inside the heater coils 32*j* or lines 32*j* exposed to the flame of the furnace 14 is quick, fast, and turbulent. Rather than remaining for hours, partially quiescent, such as up to four hours in kettle type of furnaces, somewhat above 750 F flows 32*j* may actually pass in literally minutes to a temperature of 950 F. Maintaining the plug flow keeps the walls clean inside the line 32*j*, dramatically reducing coking. Turbulence severely restricts coking by not permitting molecules to dwell long enough to carbonize in a boundary layer against the heated walls of the line 32*j*. Reducing coking also reduces fouling and its thermal resistance at the walls.

Typically, paraffins will be cracked to olefins and naphthenes. The additives will be cracked likewise (typically being among the longest chains) to separate out various lengths of hydrocarbon molecules. Metal-bearing hydrocarbons, particularly, fall to the bottom of the separator 16 to be discharged in the "bottoms" 32*q*, the flow 32*q*.

A typical content of about 2500 ppm sulfur passes into the furnace 14 in the flow 32*i*. That flow 32*i* becomes about ninety five percent vapor, containing only about 600 PPM of sulfur. Likewise, phosphates too remain largely in the bottoms 32*q*, and so are reduced elsewhere. Likewise, a cetane number of 55 therein is substantially higher than that achieved in conventional refining, which yields the vapor 32*n* a cetane number of about 40, typically. Thus, thermal cracking in the line 32; and separator 16 is particularly effective in removing metals. These metals are to be distinguished from metal chips or pieces of metal taken out by the filter 12. Rather, the metals here are mostly those bound up in hydrocarbon molecules as part of the additives. The effective cracking of additive molecules to cut out small, metal-bearing hydrocarbon molecules greatly reduces metal content from the flow 32*k*. Thus, the high molecular weight (heavy) products are removed in the flow 32*n* from that in the flow 32*k* into the separator 16. Those skilled in the art will understand that control of pressures and flows will be engineered through line diameters and lengths, pumps, and valves, and associated sensors and feedback controls, and may accommodate background atmospheric pressure where needed.

Hydro-desulfurization may be employed to further reduce sulfur. In fact, in prototypes in accordance with the invention, sulfur is reduced by from about 20 to about 80 percent, depending on the cracking temperature. Even lower sulfur content and lower viscosities are obtained when relying upon the higher end of the given ranges of temperature. Meanwhile, the speed of the flow, along with the quality of the steam that drives the flow volumetric flow rate, scrubs walls in the lines 32*j*, 32*k* to avoid coking, while still effectively removing the metals by suitable comprehensive cracking.

Cracking by the elevated temperature in the flow 32*k* results from the rapid rise in temperature in the entire flows 32*j* in from about one to about twenty minutes. It typically rises in a target range of from about four to about six minutes of residence time in the line 32*j* through the furnace 14. In the illustrated embodiment, 2000 feet (610*m*) of tubes line the inside of a forty foot (12*m*) long heater cylinder, in order to quickly heat, without coking, the UMO to a temperature sufficient to crack the weakest molecular bonds first. Flow speed and its two phase nature provide Reynolds numbers and sufficiently thin boundary layers to resist (effectively eliminate) carbonization and other fouling in the line 32*j* and flow 32*j*. Meanwhile, the mixed steam of suitable quality fraction of vapor (controlled by temperature and pressure) provides a straightforward control of the volumetric flow rate, and thus the velocity passing through the line 32*j*.

Typically, the separator 16 typically passes out through the bottom flow 32*q* only about five percent of the incoming flow 32*k*, as liquids. Most of the sulfur contained in the original incoming flow 46 entering the process 10 and the furnace 14 as a flow 32*i* is already devoid of particulate metals, particulate sediments, a majority of the sulfur originally contained, and the metal-bearing molecules cracked from the flow.

The scrubbing flow 32*aa* flowing into the separator 16 or scrubber 16 is substantially cooler than the incoming product flow 32*k*. The spray and grid 44 typically reduce the temperature of the incoming flow 32*k* by about 25 F. Accordingly, the spray tends to scrub downward molecules having greater molecular weights, and therefore comparatively higher vaporization points (boiling points). Likewise, the downward flow of the spray from the line 32*aa* also tends to sweep out heavier metal-bearing products toward the bottom of the separator 16 for eventual discharge as the "bottoms" flow 32*q*.

Typically, a polymer having a molecular weight of from about 10,000 to about 100,000 will be cracked by the temperatures promoted by the furnace 14. Meanwhile, this cracking process results in a saleable hydrocarbon exiting the separator 16 by the flow 32n and 32m.

The flash drum 48 operates at a considerably lower temperature than other components in the system 10, maintaining both lower temperature and pressure. Typically, saturation pressures at a temperature of about 150 F (66 C).

Temperature in the line 32j is controllable, and matched by the volumetric flow rate and therefore burn rate of fuel in the furnace 14. Typically, heat driving temperatures are maintained near the flame temperature of the fuel being burned in the furnace 14. To maintain that temperature, the input of flame gas must produce the amount of heat transferred into the flow 32j passing through the line 32j and the furnace 14.

In summary, a flow 46 introduced into a system 10 may enter a line 32a to be filtered and preheated to a temperature of from about 200 F (93 C) to about 600 F (316 C). Water and glycol in the flow 32f are removed by flashing in the flash drum 40. This water and glycol content is typically from about one percent to about ten percent by weight of the incoming flow 32a. The remaining liquid flow 32h from the bottom of the flash drum 40 passes into the furnace 14. There it is heated to a point from about 750 F (400 C) to about 950 F (510 C) in about four to six minutes. Typically, a time of from about one minute to about twenty minutes will render the process successful. Additional "residence" time may introduce more coking, reduction of hydrocarbon liquids to solid carbon. Otherwise, such particulates would need to be filtered out.

In certain illustrated embodiments, the pressure in the furnace 14 ranges from about twenty five PSIG (172 KPa) to about four hundred PSIG (2.76 MPa). The temperature and pressure profiles are maintained in the lines 32ag, 32i, 32j, 32k. It is important to keep the water as steam 32ag introduced from the boiler 42 through the line 32ag saturated in order to be able to control its volumes and therefore the volumetric flow rate in the line 32i, based on the quality (corresponding to vapor fraction) of steam in the flow 32i.

Ultimately, the temperature of the flow 32k passing into the separator 16 typically reduces by about 25 F (14 C) to about 250 F (121 C) thereinside. The viscosity of products flashed is significantly lower than that of the original flow 46, 32a. The majority of sulfur content typically remains with longer chain polymers that have not cracked, thereby reducing the sulfur content by about twenty to eighty percent.

Products from the furnace 14 are flashed in the separator 16 such that particulates, such as coke, and the comparatively heavier oils separate and settle into the bottom of the separator 16. Hydrocarbons in a vapor phase vaporize overhead in the separator 16, passing through the output line 32n to be further scavenged of sulfur in the scavenger 18.

Likewise, by passing therefrom into the fractionator distillation column 20, the various hydrocarbons, effectively stripped of metal particles, solid particles, metallic hydrocarbon molecules, water, and the like will then separate into fluids of various boiling temperature ranges according to the molecular weights thereof.

The fractionator 20 discharges flows 32d, 32aa, and 32ac containing from about twenty to thirty percent of the original sulfur content of the flow 46. Some amount of sulfur dioxide ($H_2S$) may be produced, but it may be removed by suitable amine treatment or caustic wash. Certain light, mercaptan sulfurs may also remove by caustic wash. Thus, the output products or flows 32z, 32ac, 32ad may be sold as unfinished gasoline, diesel, and fuel oil into markets where they may be blended into finished, low-sulfur, marine fuels.

The heavy products from the bottom of the separator 16, which may include coke particles as well as long chain (heavy molecular weight) oil products contain the vast majority of metal from the additives. Since no catalysis is required in a system 10 in accordance with the invention the outputs of the system 10 may all meet their specifications, with the small stream 32r of asphalt constituents being marketable, and containing a majority of metal-bearing molecules. Even coke separated out is fuel grade carbon.

The present invention may be embodied in other specific forms without departing from its purposes, functions, structures, or operational characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

Wherefore, what is claimed and sought to be protected by a patent is:

1. A system for cracking a used lubricating oil (ULO), the system comprising:
   a furnace having a conduit passing through the furnace, the conduit configured to maintain a velocity of a flow of the ULO within the conduit, the ULO including metal-bearing molecules, the velocity associated with a turbulent flow regime effective to resist carbonization of the ULO while heating to a first temperature effective to crack the metal-bearing molecules in the ULO to form metal constituents cracked from the metal-bearing molecules;
   a separator operably connected to in fluid flow communication and downstream of the furnace, the separator configured to remove, from the flow, metallic constituents cracked from the metal-bearing molecules;
   a scavenger in fluid flow communication with the separator and configured to remove sulfur from the flow; and
   a fractional distillation column in fluid flow communication with and downstream of the separator, the fractional distillation column configured to receive from the separator the flow and distill the flow into a plurality of streams, each stream of the plurality of streams is associated with a corresponding boiling temperature range.

2. The system of claim 1, further comprising:
   a storage subsystem configured to receive each of the plurality of streams, the storage subsystem including a plurality of storage units, each storage unit of the plurality of storage units configured to store a different stream of the plurality of streams, and
   wherein the velocity, a dimension of the conduit, and a fluid property of the flow through the conduit are effective to maintain a Reynolds number of the flow through the conduit that is greater than 2100.

3. The system of claim 2, wherein the Reynolds number of the flow through the conduit is greater than 5000.

4. The system of claim 1, further comprising:
   an inlet in fluid flow communication and positioned upstream of the conduit, the inlet configured to receive the flow including the ULO;
   a flash drum in fluid flow communication with and downstream of the inlet, the flash drum configured to receive the flow and evaporate therefrom one or more contaminants including water, glycols, light hydrocarbons, or a combination; and a steam source configured to provide steam to the flow, at a location downstream from the flash drum and upstream of the conduit, to control a volumetric flow rate of the flow entering the furnace and thereby control a dwell time, the velocity, and a Reynolds number of the flow passing through the furnace.

5. The system of claim 1, wherein:
the scavenger is configured to remove the sulfur from the flow as a vapor phase exiting the separator;
the furnace is configured to generate heat to thermally crack the ULO and reduce a molecular weight of the flow to thereby reduce a viscosity of the flow; the first temperature is selected to crack, absent coking, the metal constituents out of one or more additives of the ULO; and
a steam source is configured to deliver, into the flow, steam having a thermodynamic quality and mass flow to control a volumetric flow rate and a residence time of the flow passing through the furnace.

6. The system of claim 1, wherein:
the plurality of streams includes a diesel fuel stream; and
the fractional distillation column is configured to operate at conditions selected to produce the diesel fuel stream, as one of the streams, characterized by having a cetane index number greater than 50.

7. The system of claim 1, wherein:
the first temperature is between 700 F and 950 F;
the fractional distillation column is operated at conditions selected to produce a diesel stream as one of the streams, comprising diesel fuel characterized by a cetane index number greater than 50; and
bottoms containing the molecules of greatest molecular weight leaving the flow constitute from about 3 to about 10 percent of the flow that is input into the system.

8. The system of claim 1, wherein:
the furnace is configured to heat the flow in the conduit that passes through the furnace,
the separator operably connected to receive the flow from the furnace, and
the system is configured to:
introduce the ULO as the flow into the furnace, the ULO including additives containing the metal-bearing molecules;
crack, by the furnace, the flow at the first temperature;
remove from the flow, by the separator, the metal constituents cracked out of the metal-bearing molecules; and
separate, by the fractional distillation column, the flow into the plurality of streams.

9. The system of claim 1, wherein the system is configured maintain the velocity and a Reynolds number of the flow through the furnace at respective values effective to minimize coking of the ULO and fouling of the conduit.

10. A system for cracking a used lubricating oil (ULO), the system comprising:
a conduit configured to maintain a velocity of a flow through the conduit, the flow through the conduit includes a used lubricating oil (ULO) including metal-bearing molecules, and the velocity effective to resist carbonization of the ULO during heating of the ULO to at least a temperature;
a furnace having at least a portion of the conduit passing through the furnace, the furnace configured to heat the ULO within the conduit to at least the temperature to crack the metal-bearing molecules to form metal constituents;
a scavenger in fluid flow communication with and downstream of the conduit, the scavenger configured to remove sulfur from the flow; and
a fractional distillation column coupled to and positioned downstream of the furnace, the fractional distillation column configured to:
after removal of the metallic constituents from the flow output from the furnace, receive the flow; and
distill the received flow into a plurality of outputs.

11. The system of claim 10, further comprising:
an inlet in fluid flow communication with and upstream of the conduit, the inlet configured to receive the flow including the ULO;
a steam source configured to provide steam to the flow, at a location downstream from the inlet and upstream of the conduit;
a separator system in fluid flow communication with and positioned downstream of the conduit, the separator system configured to remove one or more components from the flow; and
a storage subsystem including a plurality of storage units, each storage unit configured to receive a different output of the plurality of outputs.

12. The system of claim 11, wherein the separator system includes:
a separator in fluid flow communication with and downstream of the conduit, the separator configured to remove, from the flow, metallic constituents cracked from the metal-bearing molecules.

13. The system of claim 12, wherein:
a Reynolds number of the flow through the conduit that is greater than 2100;
the temperature is between 700 F and 950 F; and
the system is configured maintain the velocity and the Reynolds number of the flow through the furnace at respective values effective to minimize coking of the ULO and fouling of the conduit.

14. A system for cracking a used lubricating oil (ULO), the system comprising:
a furnace including an input, an output, and a conduit coupled to the input and the output, the conduit defining a flow path through the furnace between the input and the output, the furnace configured to:
receive, via the input, used lubricating oil (ULO) as a flow, the ULO including additives containing metal-bearing molecules;
heat the flow through the flow path; and
crack the flow at a first cracking temperature to produce metal constituents cracked out of the metal-bearing molecules;
a separator operably connected to in fluid flow communication and downstream of the furnace, the separator configured to remove, from the flow, metallic constituents cracked from the metal-bearing molecules; and
a scavenger in fluid flow communication with and downstream of the separator, the scavenger configured to remove sulfur from the flow.

15. The system of claim 14, wherein the scavenger is configured to be regenerated based on a heating operation or a cleaning operation.

16. The system of claim 14, further comprising:
a fractional distillation column in fluid flow communication with and downstream of the scavenger, the fractional distillation column configured to:

receive the flow having the metallic constituents removed therefrom by the separator; and distill the flow into a plurality of streams, each stream of the plurality of streams characterized by a corresponding boiling temperature range.

17. The system of claim 16, further comprising:

a storage subsystem configured to receive the plurality of streams as separate streams from the fractional distillation column, the storage subsystem including:
  a first subsystem configured to receive a first stream of the plurality of streams, the first stream characterized by a first boiling temperature range; and
  a second subsystem configured to receive a second stream of the plurality of streams, the second stream characterized by a second boiling temperature range that is different from the first boiling temperature range.

18. The system of claim 14, wherein the conduit is configured to maintain a velocity of a flow of the ULO within the conduit;

the velocity is associated with a turbulent flow regime effective to resist carbonization of the ULO while being heated to a first temperature effective to crack the metal-bearing molecules in the ULO to form the metal constituents cracked from the metal-bearing molecules;

the furnace is configured to generate heat to thermally crack the ULO and reduce a molecular weight of the flow to thereby reduce a viscosity of the flow; and the first temperature is selected to crack, absent coking, the metal constituents out of one or more additives of the ULO.

19. The system of claim 14, further comprising:

a flash drum in fluid flow communication with and upstream of the furnace, the flash drum configured to receive the flow and evaporate therefrom one or more contaminants including water, glycols, light hydrocarbons, or a combination a steam source configured to provide steam to the flow, at a location downstream from the flash drum and upstream of the conduit, to control a volumetric flow rate of the flow entering the furnace and thereby control a dwell time, a velocity, a Reynolds number of the flow passing through the furnace, or a combination thereof.

\* \* \* \* \*